(12) United States Patent
Loreskar

(10) Patent No.: US 11,882,442 B2
(45) Date of Patent: Jan. 23, 2024

(54) HANDSET IDENTIFIER VERIFICATION

(71) Applicant: TRUSTONIC LIMITED, Cambridge (GB)

(72) Inventor: Chris Loreskar, Cambridge (GB)

(73) Assignee: Trustonic Limited, Cambridge (GB)

(*) Notice: Subject to any disclaimer, the term of this patent is extended or adjusted under 35 U.S.C. 154(b) by 41 days.

(21) Appl. No.: 17/541,578

(22) Filed: Dec. 3, 2021

(65) Prior Publication Data
US 2022/0095107 A1 Mar. 24, 2022

Related U.S. Application Data

(62) Division of application No. 16/346,618, filed as application No. PCT/GB2017/053296 on Nov. 2, 2017, now Pat. No. 11,228,907.

(30) Foreign Application Priority Data

Nov. 24, 2016 (GB) ................................ 1619918

(51) Int. Cl.
H04W 12/06 (2021.01)
H04L 9/32 (2006.01)
(Continued)

(52) U.S. Cl.
CPC ........... H04W 12/06 (2013.01); H04L 9/3247 (2013.01); H04L 63/0823 (2013.01); H04L 63/0876 (2013.01); H04L 63/0892 (2013.01); H04L 63/101 (2013.01); H04W 8/24 (2013.01); H04W 12/08 (2013.01); H04W 12/71 (2021.01); H04W 8/12 (2013.01)

(58) Field of Classification Search
CPC ......... G06F 21/629; G06F 16/24; G06F 9/543
See application file for complete search history.

(56) References Cited

U.S. PATENT DOCUMENTS

2012/0002808 A1   1/2012   Wang
2012/0100832 A1   4/2012   Mao et al.
(Continued)

FOREIGN PATENT DOCUMENTS

WO   2013/139071   9/2013
WO   2016/155827   10/2016

OTHER PUBLICATIONS

U.S. Appl. No. 16/346,618, filed May 1, 2019; Loreskar.
(Continued)

Primary Examiner — Ashokkumar B Patel
Assistant Examiner — William B Jones
(74) Attorney, Agent, or Firm — NIXON & VANDERHYE P.C.

(57) ABSTRACT

A terminal device seeking access to a mobile network retrieves a handset identifier identifying the terminal device and a cryptographic key for proving an identity of the terminal device from storage circuitry of the terminal device. The terminal device generates signature information by signing a block of information including the handset identifier using the cryptographic key. During a network connection process for negotiating access to the mobile network with a network control device, the terminal device communicates the signature information to the network control device.

12 Claims, 5 Drawing Sheets

(51) Int. Cl.
　　　*H04L 9/40*　　　(2022.01)
　　　*H04W 8/24*　　　(2009.01)
　　　*H04W 12/08*　　(2021.01)
　　　*H04W 12/71*　　(2021.01)
　　　*H04W 8/12*　　　(2009.01)

(56) References Cited

U.S. PATENT DOCUMENTS

| | | |
|---|---|---|
| 2013/0036223 A1 | 2/2013 | Du et al. |
| 2014/0032691 A1* | 1/2014 | Barton ............... H04W 12/08 709/206 |
| 2014/0259147 A1 | 9/2014 | L'Heureux |
| 2016/0112203 A1* | 4/2016 | Thom ................. G06F 21/72 713/176 |
| 2017/0222878 A1 | 8/2017 | Jacquin |
| 2019/0303596 A1* | 10/2019 | Du ..................... G06F 21/629 |

OTHER PUBLICATIONS

Office Action dated Oct. 26, 2020 for U.S. Appl. No. 16/346,618, 22 pages.
Final Office Action dated Mar. 11, 2021 for U.S. Appl. No. 16/346,618, 20 pages.
Advisory Action dated Jun. 25, 2021 for U.S. Appl. No. 16/346,618, 7 pages.
International Search Report for PCT/GB2017/053296, dated Jan. 22, 2018, 5 pages.
Written Opinion of the ISA for PCT/GB2017/053296, dated Jan. 22, 2018, 7 pages.
Office Action for EP Application No. 17795021.9 dated Feb. 5, 2021, 7 pages.

* cited by examiner

HANDSET IDENTIFIER VERIFICATION

CROSS-REFERENCE

This application is a divisional of U.S. application Ser. No. 16/346,618, filed May 1, 2019, which is the U.S. national phase of International Application No. PCT/GB2017/053296 filed Nov. 2, 2017 which designated the U.S. and claims priority to GB Patent Application No. 1619918.4 filed Nov. 24, 2016, the entire contents of each of which are hereby incorporated by reference.

BACKGROUND

The present technique relates to the field of mobile communication.

Devices communicating on a mobile network may be identified by an International Mobile Equipment Identity (IMEI) number which identifies the particular handset. The IMEI can be used for device tracking, or for blacklisting devices which have been reported as stolen, so that a device having a blacklisted IMEI is prevented from communicating on the network. The IMEI can also be used for tracking prototype devices on the network during testing of the prototypes.

SUMMARY

At least some examples provide a network usage control method comprising:
receiving a handset identifier of a requesting terminal device seeking to use a mobile network;
retrieving verification information for verifying an identity of an authorised terminal device associated with the handset identifier;
verifying, based on the verification information, whether the requesting terminal device is said authorised terminal device; and
controlling usage of the mobile network by the requesting terminal device in dependence on whether the requesting terminal device is verified as said authorised terminal device.

At least some examples provide a network usage control device comprising:
processing circuitry configured to:
receive a handset identifier of a requesting terminal device seeking to use a mobile network;
retrieve verification information for verifying an identity of an authorised terminal device associated with the handset identifier;
verify, based on the verification information, whether the requesting terminal device is said authorised terminal device; and
control usage of the mobile network by the requesting terminal device in dependence on whether the requesting terminal device is verified as said authorised terminal device.

At least some examples provide a terminal device comprising:
storage circuitry to store a handset identifier identifying the terminal device and a cryptographic key for proving an identity of the terminal device;
processing circuitry to generate signature information by signing a block of information including the handset identifier using the cryptographic key; and
communication circuitry to communicate on a mobile network, wherein during a network connection process for negotiating access to the mobile network with a network control device, the communication circuitry is configured to communicate the signature information to the network control device.

At least some examples provide a method for a terminal device seeking access to a mobile network, the method comprising:
retrieving a handset identifier identifying the terminal device and a cryptographic key for proving an identity of the terminal device from storage circuitry of the terminal device;
generating signature information by signing a block of information including the handset identifier using the cryptographic key; and
during a network connection process for negotiating access to the mobile network with a network control device, communicating the signature information to the network control device.

At least some examples provide a computer program for controlling a data processing apparatus to describe either of the methods described above. The computer program may for example be stored on a recording medium. The recording medium may be a non-transitory medium.

BRIEF DESCRIPTION OF THE DRAWINGS

Further aspects, features and advantages of the present technique will be apparent from the following description of examples, which is to be read in conjunction with the accompanying drawings, in which.

DESCRIPTION OF EXAMPLE EMBODIMENTS

Figure 1:
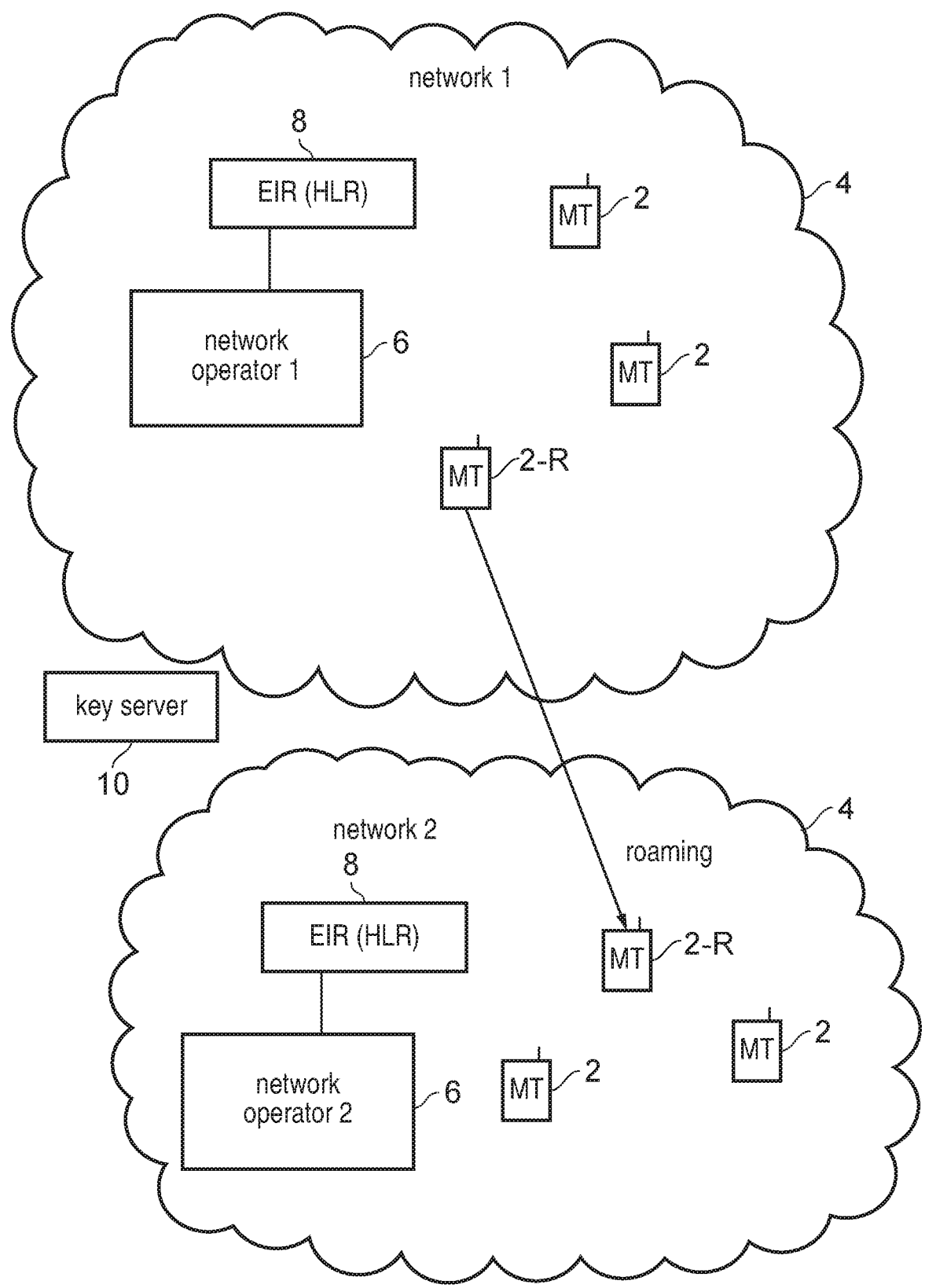
FIG. 1 schematically illustrates an example of mobile network communication.

FIG. 1 shows an example of mobile terminals 2 communicating within one of a number of mobile networks 4. Each mobile network 4 may be managed by a network operator 6 who may control access to the network 4 by certain mobile devices 2. While each network operator 6 is logically shown as a single device in FIG. 1, it will be appreciated that the functionality performed by the network operator 6 could be distributed between two or more distinct servers or other processing devices. For example, the network operator 6 may control which terminal devices 2 can connect to their network or are allowed to perform specific functions on the network such as making voice calls, sending text (SMS) messages, etc. Each network operator 6 may maintain an Equipment Identity Register (EIR) 8 which may specify information for controlling network access, which may include a Home Location Register (HLR) which provides information about each subscriber subscribing to that network operator's 6 network. The network operators 6 of different networks can communicate with each other to control network access in instances where a given device 2-R associated with a particular home network is "roaming" (temporarily visiting another network) and wishes to connect to the visiting network. As shall be discussed in more detail below, the network operator devices 6 can also communicate with a key server 10 for providing cryptographic information for verifying the identity of particular mobile terminals 2. Note that the key server 10 is optional and in other examples the information for verifying the identity of a particular terminal 2 may come from the terminal itself 2 or may already reside in the EIR 8. For example, the terminal device may already have obtained the digital certificate for verifying its own identity, and can provide the certificate to the network alongside the device signature to be checked using the certificate. Also, the certificate may already reside in the EIR 8 if the device has been encountered before, or if the EIR 8 receives a batch of certificates through out of band communication (without having encountered the device).

Figure 2:
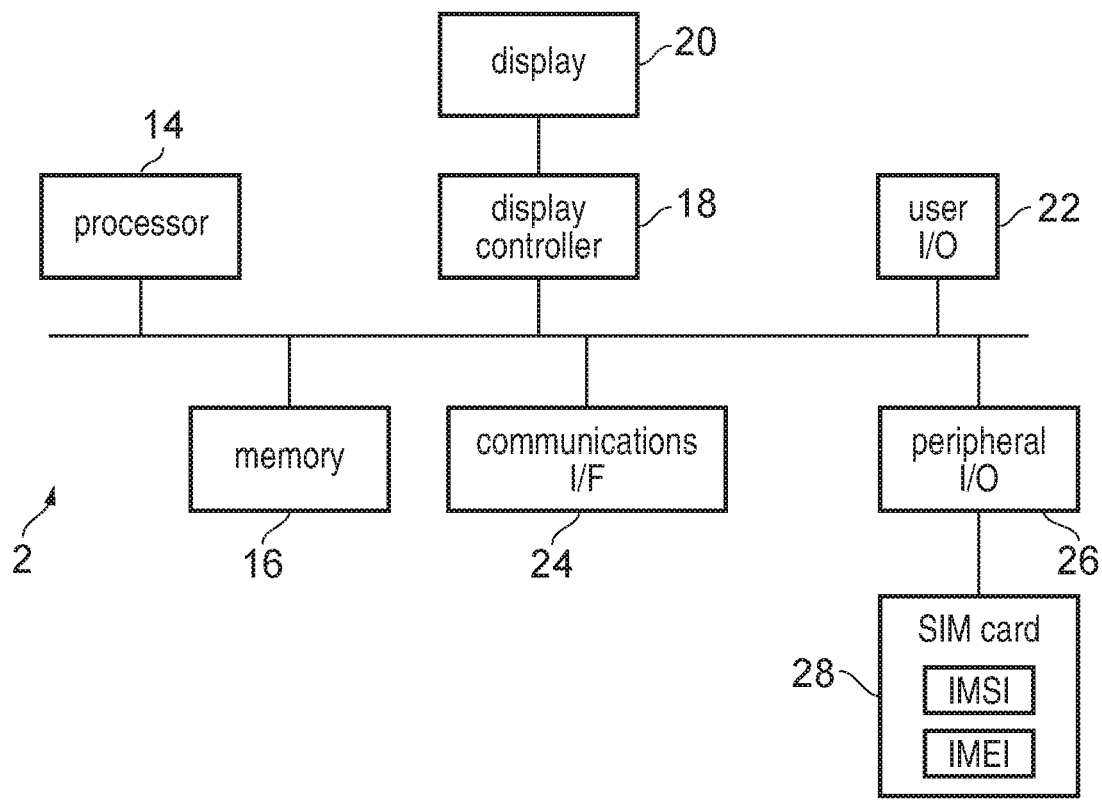
FIG. 2 schematically illustrates a simplified example of an electronic device.

FIG. 2 schematically illustrates an example of one of the mobile terminals 2. The mobile terminal 2 comprises a processor 14, memory 16, display controller 18 and display 20, user input/output circuit 22 for accepting user input (e.g. a keypad or touch screen), communications interface 24 (e.g. a modem) for communicating with other devices on the network, and a peripheral input/output circuit 26 for communicating with other peripheral devices, such as a memory card providing further data storage or a fingerprint sensor for detecting fingerprints. In operation, the processor 14 executes computer program instructions that may be stored in the memory 16, an external data storage unit or dynamically downloaded via the communications interface 24. The results of the processing performed may be displayed to a user via the display controller 18 and display 20. User inputs for controlling the operation of the mobile terminal 2 may be received via the user input/output circuit 22. It will be appreciated that the computer program could be written in a variety of different computer languages. The computer program may be stored and distributed on a recording medium or dynamically downloaded to the device via the communications interface 24. It will be appreciated that this is a simplified example of some components of the terminal 2, and the architecture of the device may vary considerably, for example it may have other elements not shown in FIG. 2 for conciseness. For example, some embodiments may not have the display controller 18 and display 20, e.g. the device could be a sensor which merely gathers data but has no user interface functionality. The terminal could be any device capable of communicating on the mobile network 4, including not only a mobile cellular telephone or tablet computer, but also other devices with mobile communication functionality, such as a sensor or actuator in the Internet of Things (e.g. included within an appliance such as a television, washing machine or refrigerator, or in public infrastructure such as in streetlighting or traffic lights, for example). Hence, the present technique is not restricted as to the particular type of terminal device.

One of the peripherals in communication with the I/O unit 26 may be a SIM (subscriber identity module) card 28 for securely storing information defining the identity of the subscriber (the user of the mobile terminal), which can be used for verification of the user on connection to a mobile network. The SIM card 28 may store an International Mobile Subscriber Identity (IMSI) number which identifies the particular subscriber. The EIR 8 of the user's home network may include a HLR which associates the IMSI number with other information about the subscriber.

The mobile terminal device is also associated with an International Mobile Equipment Identity (IMEI) number which identifies the particular mobile handset (independently from the user of the handset). The IMEI number can be stored in the memory 16. The IMEI number is independent of the IMSI number, since if the user buys a new handset but uses their existing SIM card 28, the IMEI number would change but the IMSI number would stay the same. In the examples below, the IMEI number is an example of a handset identifier which identifiers the particular terminal device to the network, and the IMSI number is an example of a subscriber identifier which identifiers the subscriber using the handset. However, it will be appreciated that the techniques discussed below can also be applied to other forms of handset identifier or subscriber identifier. The handset identifier could also be referred to as a terminal identifier.

Figure 3:
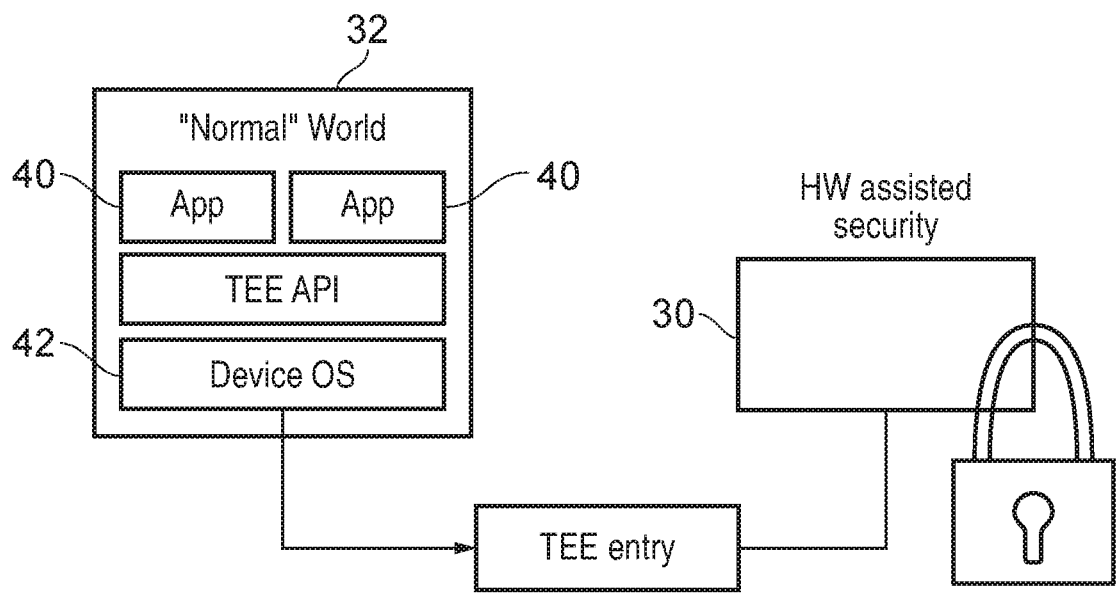
FIG. 3 shows an example of normal and secure runtime environments which may be implemented on the electronic device.

In some examples, to increase security, the electronic device 2 may have a hardware architecture which supports operation of a secure runtime environment 30 in addition to a normal runtime environment 32, as shown in FIG. 3. Secure data may be processed using trusted applications and/or a secure operating system executing under the secure run time environment 30. Hardware mechanisms may be provided to ensure that applications 40 or an operating system 42 running in the normal runtime environment 32 cannot access secure data or code associated with the secure runtime environment 30. For example, a memory management unit or similar structure can be used to partition the memory address space into secure and normal regions, and prevent access to the secure regions by code executing in the normal runtime environment 32. There are a number of options for policing access to the secure runtime environment 30. In one example, transitions between the normal and secure runtime environments may be policed by secure monitor code which may permit transitions in a limited set of circumstances. For example, an exception mechanism may be used to trigger transitions between the runtime environments via the monitor code, which can check whether the application requesting access to the secure runtime environment is allowed to do so. Alternatively, rather than using software to police the transitions, the hardware architecture could permit branching between the normal and secure runtime environments 30, 32 directly, but hardware mechanisms may be provided to ensure safe transitions, such as requiring that the non-secure code only branches to secure code at certain predetermined entry points. For example, a given application may then branch to a function in the secure domain for carrying some security-sensitive functionality such as password checking, before branching back to the normal world 32 at the end of the function. Hardware assisted security mechanisms may also implement a protected communication channel between the communication interface 24, storage circuitry (such as memory 16 or the SIM card 28) and the processor 14 when executing trusted applications, to protect against local interception or tampering of secure data (such as the IMSI or IMEI number of cryptographic key information) when it is passing between the storage 16, 28, processor 14 and communication interface 24. An example of a hardware architecture providing such a secure runtime environment 30 may be the Trustzone® architecture provided by ARM® Limited of Cambridge, UK, although other examples are also available. Hence, if a secure runtime environment is implemented on the device 2, then this can provide greater protection for sensitive data or code running on the device. Nevertheless, the present technique can also be applied to devices not having such a secure runtime environment implemented in the hardware architecture of the device 2.

On connection to a mobile network 4, the network operator 6 validates the IMSI number of the device to check that the subscriber is allowed to communicate on the network (e.g. checking that the subscriber is a valid customer of that network who has paid to use the network, or in the case of roaming authenticating the subscriber through contacting the subscriber's home network operator). The authentication towards the network comprises the network operator 6 passing down a set of nonces (single use random numbers) which are provided to authentication functions of the terminal's SIM card 28, and information is then generated in dependence on the IMSI number and the nonces to prove the subscriber's identity to the network operator 6. Once the subscriber has been identified, the network connection is established. The network operator 6 may also check whether the IMEI number of the mobile handset 2 is on a "black list" of handsets reported as stolen, and if the IMEI number is one of the blacklisted handsets, the network access is denied.

However, if the IMEI of the device 2 can be modified, it thwarts the whole idea of blacklisting stolen devices. Furthermore, if a vulnerable device can be cloned to have the IMEI (identity) of another legitimate device, from a legal point of view, a law-abiding user using its device could become a suspect in an investigation under the wrong pretenses if the IMEI was tracked to them. The database of stolen IMEIs which mobile network operators 6 can query to see if the mobile terminal 2 should be rejected is only so effective, because it only knows of devices which have been reported stolen. As the IMEIs are predictive numbers generated according to a known scheme (e.g. with a Luhn digit for error checking), an adversary wanting to set a valid IMEI in a device is more or less free to choose an IMEI from a huge pool of unallocated (or pre-allocated) values. Thus the database of stolen IMEIs cannot counter this. While recording IMEIs of all valid handsets (rather than just indicating IMEIs of stolen handsets) can prevent the adversary selecting an unallocated IMEI value, it still does not address the cloning problem where the adversary selects the same IMEI used by a legitimate user. When an adversary clones the IMEI of a legitimate device, a duplicate entry appears in the network. As the IMEI per se is valid, current networks cannot distinguish which device actually "owns" that IMEI.

The technique described below enforces a tamperproof IMEI on the device and ensures that the network only allows devices with valid IMEIs to access the network. The IMEI can be secured locally on the device itself (for regulatory reasons etc.) as well as ensuring that the network knows that the device's IMEI actually is legitimate when the device attempts to connect to a mobile network 4. As the IMEI of the device was known at manufacturing time, the IMEI has a good known value and the system ensures that adversaries cannot freely choose any random IMEI as it has to match exactly the one it received in the factory—nothing else will validate. The technique also provides freshness to the validation such that an adversary cannot just replay an old successful authentication.

The device's IMEI is registered with the subscriber's identity (HLR) in the EIR (Equipment Identity Register) and when the device is roaming, the visiting network can ask the Home Location Register for more information about the subscriber and the device itself. As the IMEI is known by the HLR, the HLR (or the visiting network operator) can validate the IMEI to ensure it is valid. When a device is using another legitimate device's IMEI (i.e. cloning it) and a duplicate entry appears in a given network's list of active devices, the network can validate the IMEI and the device with the cloned IMEI will be rejected from network attachment.

Hence, the IMEI can be validated on the device before network registration, but is also passed in a secure transfer to the network for validation before the device is allowed on to the network. A secure environment (such as the one discussed above with respect to FIG. 3) can be used to protect the IMEI against tampering locally on the device. In order for the device to pass the IMEI to the network, it needs a temporary access granted by the network to pass data (e.g. by using the emergency calls only communication mode), but is still not allowed general purpose access by the network. The subscriber's HLR (EIR) also contains an entry of the IMEI, which can be queried by other mobile network operators 6 when the subscriber is roaming to ensure validity of the IMEI (an extra validation step can be added to the communication between the visiting network and the home network for subscriber validation that includes IMEI verification).

Figure 4:
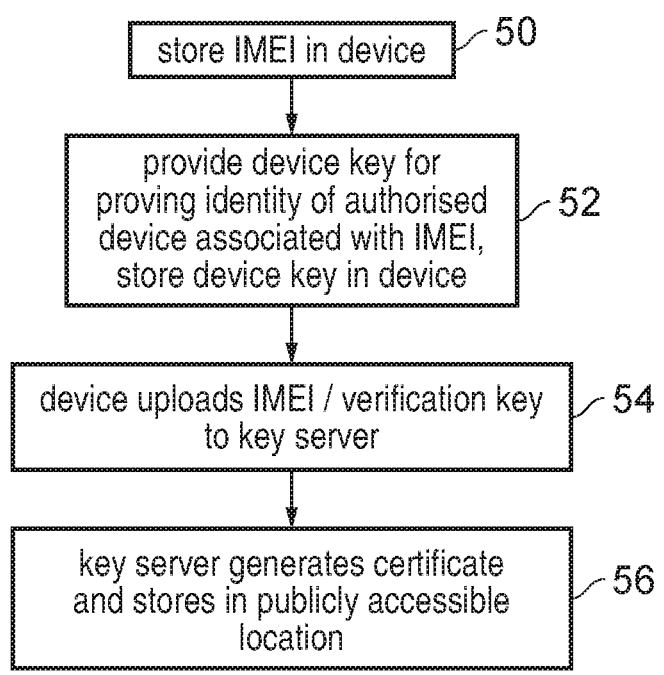
FIG. 4 shows an example of establishing cryptographic identity information for binding a handset identifier (e.g. an IMEI number) to a particular terminal device.

FIG. 4 shows a method of establishing a binding between a particular IMEI number and a particular mobile terminal device 2. The method can be performed during part of the process for manufacturing the mobile terminal device 2, or alternatively can be performed later (e.g. a device may be returned to the manufacturer or to a different party for refurbishment after it has already been used in the field, and at the point of refurbishment may be provided with a new IMEI identity).

At step 50 an IMEI is allocated to the device 2 and stored within the device 2. For example, the IMEI could be stored to the memory 16 (although once a SIM card is installed the IMEI could later be transferred to the SIM card 28). The IMEI may be stored as secure data protected by the secure domain 30 of the hardware assisted security mechanism. The IMEI may be selected from a pool of unallocated IMEIs not currently used by any existing mobile device 2. At step 52, a device specific key is provided for proving the identity of the authorised device associated with the IMEI, and stored within the secure storage of the device 2. The device key could be generated locally within the device itself, or generated externally and then injected into the device. At step 54, a receipt is generated comprising the IMEI and a verification key for verifying that the device 2 has the device key. The receipt is uploaded to the key server 10. The key server 10 can be maintained by a particular network operator or by a third party (e.g. a certification authority) independent of the mobile network operators. At step 56 the key server creates a digital certificate (e.g. X.509 certificate) which contains the IMEI number and the verification key (the certificate could also include other information about the authorised device associated with that particular IMEI number). The certificate is stored in a publicly facing web server so that it can be requested by mobile network operators when authenticating a terminal device requesting access to a network.

In some examples, the device key and verification key provided at steps 52, 54 may in fact be exactly the same key. That is, a symmetric key may be used both by the terminal device 2 to prove its identity, and by other parties to verify the identity of the terminal device. Alternatively, the device key and verification key may be different complementary keys, e.g. the device key can be a private key known only to the particular device authorised to use the particular IMEI value, and the verification key may be a public key which can be published as part of the device certificate so that other parties can decrypt data encrypted using the device's private key to verify that the particular device presenting the IMEI for network access is actually the device to which that IMEI value was allocated.

Also, while FIG. 4 shows an example where the key is uploaded to the key server 10 and the key server 10 generates the certificate at steps 54, 56, in other examples the certificate could be generated and stored locally within the terminal device 2, or generated locally and out of band transmitted to the EIR 8 of the network operator. Hence, it is not essential for a key server 10 to be used.

Also, the digital certificate is just one example of verification information for verifying the binding between the IMEI and the device 2. In general, any information which can be used to tie the IMEI value to a particular device can be used (e.g. the verification information could simply be a decryption key for decrypting data encrypted using the device's key, but need not be in the form of a certificate).

Figure 5:
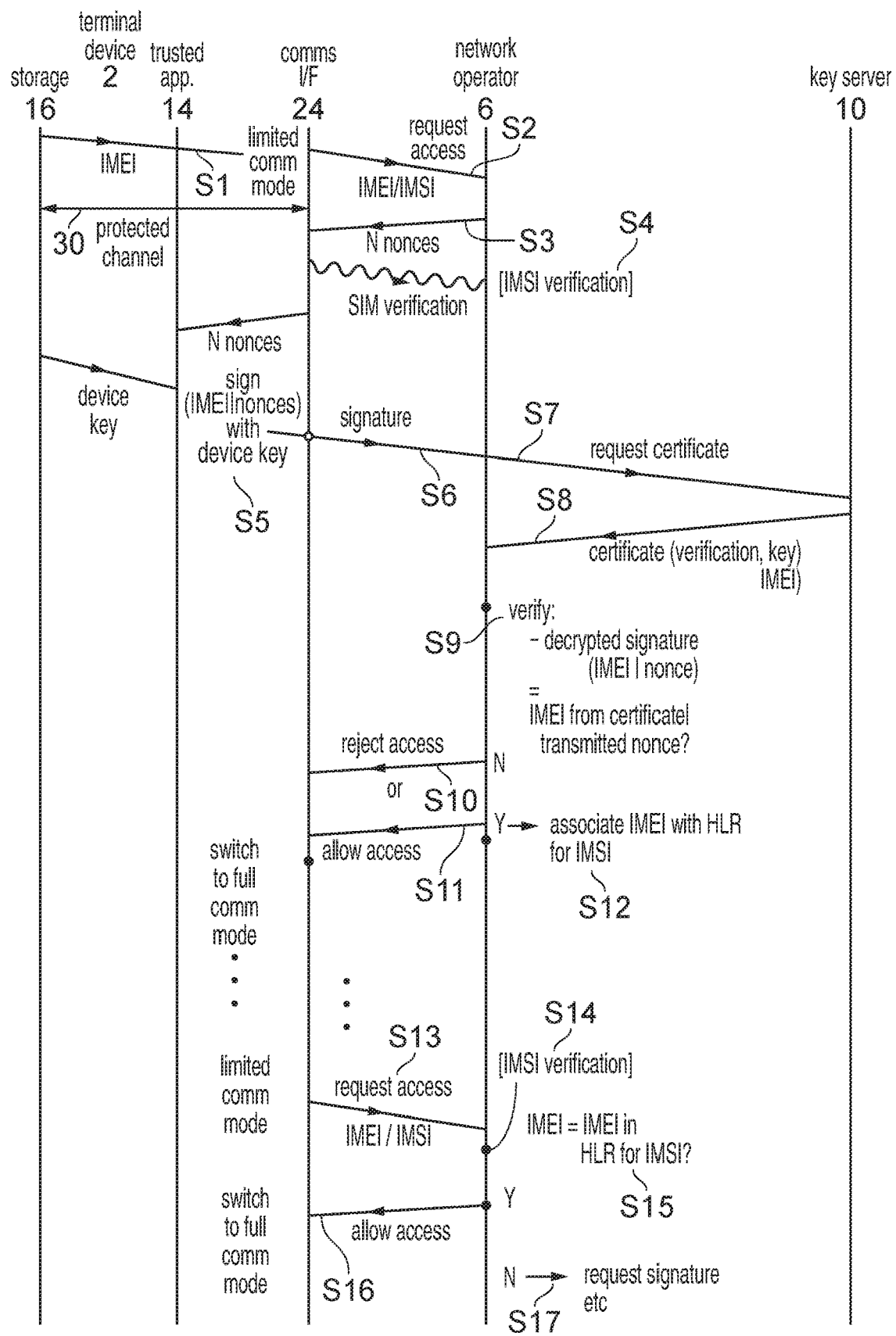
FIG. 5 shows a method for a network operator to control access to a mobile network based on verification of whether a requesting terminal device specifying a handset identifier is an authorised terminal device associated with that handset identifier.

FIG. 5 shows a process for a mobile network operator 6 to control access to a mobile network 4 by a requesting terminal device 2 seeking access to the network, in which the IMEI of the device is validated by the network before permitting network access, to verify whether the requesting terminal device 2 is the authorised terminal device associated with the IMEI number.

When the device 2 starts, the communication interface 24 remains in a limited communication mode (emergency calls only) and awaits a verdict if the IMEI (or SIMLock settings) are valid before continuing. The communication interface 24 will at some point in time attempt to register to the network, typically when the SIM becomes active (unlocked etc.). The communication interface 24 requests (S1) the IMEI from the trusted application running on the processor 14, which obtains the IMEI from secure storage (e.g. the memory 16) using a secure channel 30 set up between the communication interface 24, storage 28 and processor 14 as discussed above. The communication interface 24 of the device 2 transmits (S2) a request for network access, including transmitting the IMEI and IMSI numbers of the device and subscriber respectively to the network operator 6 for network validation. The network operator 6 passes a given set of N nonces (S3) to the device 2 (N≥1), and the device 2 and mobile network perform verification of the subscriber using the nonces and IMSI number using any known SIM verification technique (S4).

The nonces are also passed to the trusted application 14 for verifying the IMEI of the mobile handset 2. While in this example the IMEI verification uses the same nonces as the IMSI verification, it would also be possible for the network operator 6 to transmit a different set of nonces for use in the IMEI verification. The nonces are random numbers which are generated afresh for each network connection attempt, to prevent replay attacks where signature data from an old successful connection are used to gain access in future by an attacker. The nonces are an example of a freshness indicator (other examples are discussed below).

The trusted application 14 receives the nonces and generates a given function of the nonces (e.g. a cryptographic function such as SHA256 can be used to generate a value SHA256(NONCE1| . . . |NONCEn) dependent on the received nonces). The trusted application 14 signs (S5) a blob of the transformed nonces in conjunction with the IMEI it previously stored, using its device key which was embedded in the device at step 52 of FIG. 4—e.g. sign(SHA256 (NONCE1| . . . | NONCEn)|<IMEI>, DeviceKey). The signature generated by signing the nonces and IMEI using the device key is passed back to the communication interface 24 which sends (S6) the signature to the network operator 6 for further processing.

The network operator 6 receives the signature (and IMEI if it is not already received at step S2), and requests (S7) from the key server 10 the corresponding device certificate for further validation. The key server 10 returns (S8) the certificate if it finds it (if no certificate has been uploaded then it may inform the network operator 6 that the IMEI cannot be authenticated). Note that while FIG. 5 shows a single key server 10, there may a number of certification providers which could store certificates for authenticating IMEIs of devices, so in some cases the network operator 6 may query each of those key servers 10 to identify the certificate associated with the particular IMEI. Also, in some cases certificates for particular IMEIs could be cached at the network operator's device itself so that it is not always required to access the key server 10 to locate the device's certificate.

The network operator 6 receives the certificate and verifies (S9) whether the requesting terminal 2 which provided the IMEI number is the same as the authorised terminal device which is cryptographically bound to that IMEI number. Hence, the network operator 6 decrypts the signature received from the requesting terminal device 2 using the verification key included with the certificate, and checks whether:

the IMEI number in the decrypted signature matches the IMEI number provided by the requesting terminal device 2; and the function of the nonces in the decrypted signature matches a corresponding function of the nonces transmitted to the terminal device 2 at step S3.

If either the IMEI number or the nonce function does not match, then access to the network is rejected (S10), as it cannot be proved that the requesting terminal device 2 seeking to access the network is actually the authorised device bound to that IMEI number (e.g. the requesting terminal device 2 could be in the hands of a thief who has cloned another device's IMEI).

Network access could also be rejected if no certificate for the IMEI number provided by the requesting terminal can be found on any key server 10. Alternatively, in the case when no certificate can be found, network access could still be allowed, but some other operation may be performed, such as logging of the accesses made by the device, or placing other restrictions on the device (e.g. certain functionality prevented even if some limited functionality is allowed). Hence, it is not essential for network connection to be rejected completely in this case, and some configuration settings may be implemented in the network operator 6 to control how cases of missing certificates are handled.

On the other hand, if both the IMEI number and the nonce function in the decrypted signature match, then the signature verification is successful, and the network operator 6 informs the terminal device 2 that network access is allowed (S11), and in response the terminal device 2 may switch to a full communication mode in which the restrictions provided by the limited communication mode up to that point are removed (e.g. voice calls or messaging other than emergency calls may now be permitted). On successful verification of the IMEI number, the network operator 6 can also update (S12) the EIR 8 to associate the valid IMEI number with the subscriber's HLR (identified based on the IMSI number). Note that as a single subscriber could transfer their SIM card 28 between two or more different handsets, each of which may separately have been authenticated as being the authorised device associated with the corresponding IMEI, the subscriber's HLR may sometimes specify a list of two or more different IMEIs, each of which is valid for that particular subscriber. Also, it is possible for the same IMEI to appear in more than one subscriber's HLR, e.g. if different subscribers insert their SIM cards into the same terminal device and each have that device's IMEI validated and stored to their respective HLRs.

Recording the authenticated IMEI number in the HLR can be useful for two purposes. Firstly, it can speed up subsequent authentication of the same subscriber using the same handset, as it may not be necessary to perform the cryptographic authentication of the IMEI again using the signature and certificate. Hence, as shown at the bottom of FIG. 5, on a subsequent network access, the device 2 again operates in the limited communication mode, and requests (S13) access in the same way as at step S2. The IMSI verification (S14) may still be performed in the same way as at step S4. However, the network operator 6 checks the EIR 8 and determines (S15) whether the IMEI provided by the requesting terminal device is in the list of one or more valid IMEIs recorded in the HLR associated with that subscriber's IMSI number. If the IMEI is in the authorised list, then network access is allowed (S16) and steps S5-S12 discussed above can be omitted. However, if the IMEI is not in the authorised list, then the IMEI can be validated (S17) using the signature and certificate in the same way as at steps S5-S12.

Figure 6:
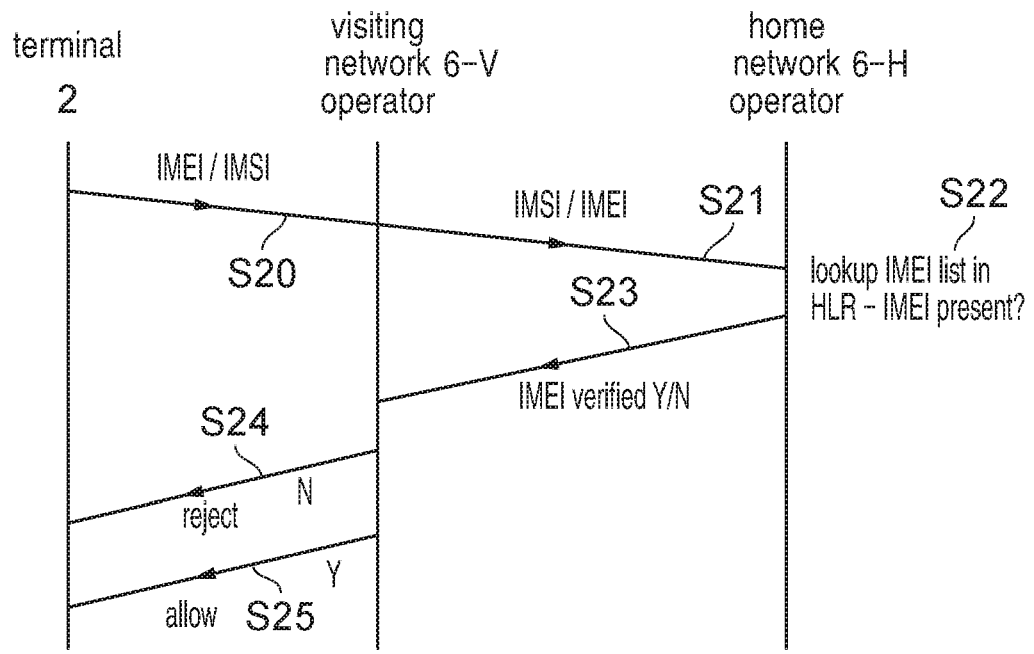
FIGS. 6 and 7 show two examples of performing the handset identifier verification for a terminal device during roaming.
Figure 7:
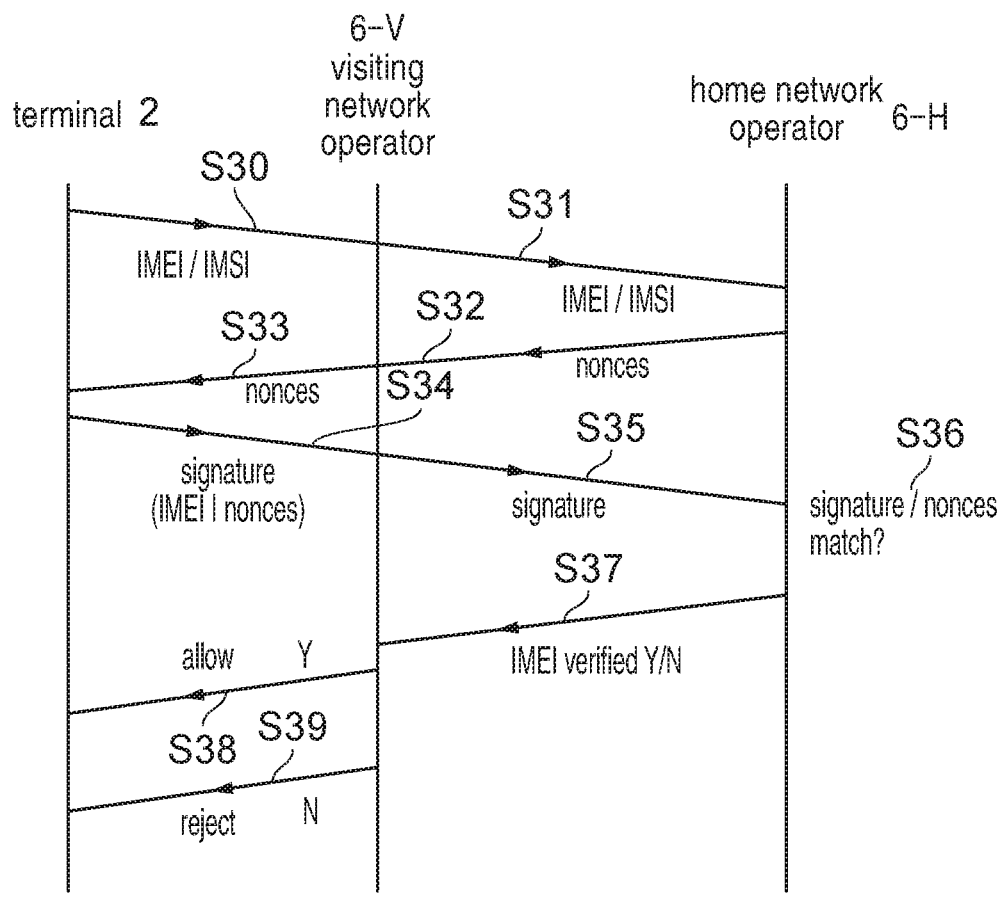

Also, recording the authenticated IMEI number in the HLR can be useful for handling roaming, when a device from a "home network" visits another network (the "visiting network"). During roaming of a foreign subscriber on a foreign device, the visiting network has no idea how to validate the subscriber (for billing purposes) nor how to validate the IMEI of the device itself, and so asks the home network of the subscriber for further validation. The IMSI validation can take place using any known technique. FIGS. 6 and 7 show two examples of how the IMEI validation can be handled.

As shown in FIG. 6, the roaming terminal device 2 provides (S20) the IMEI and IMSI numbers to the visiting network operator 6-V. The visiting network operator 6-V provides (S21) the IMEI and IMSI numbers to the device's home network operator 6-H, which looks up the subscriber's HLR based on the IMSI number, checks (S22) whether the IMEI supplied by the visiting network operator 6-V is in a "valid list" of one or more IMEIs previously authenticated as valid by the home network operator 6-H, and returns (S23) an indication of whether the IMEI has been verified (whether the IMEI was in the valid list). The visiting network operator 6-V determines whether the IMEI has been verified by the home network operator 6-H. If the IMEI has not been verified, network access is rejected (S24) by the visiting network operator 6-V while if the IMEI has been verified, then network access to the visiting network is allowed (S25). In summary, the HLR of the subscriber stores the IMEI alongside other meta data associated with the IMSI (in the EIR 6) and the IMEI is validated between the networks when the device requests to attach to a foreign network.

Alternatively, as shown in FIG. 7 the cryptographic identity binding the IMEI to a particular device can be checked during roaming. Again, the terminal device 2 requests (S30) access to the visiting network by transmitting its IMEI and IMSI numbers, which are passed on (S31) to the subscriber's home network operator 6-H by the visiting network operator 6-V, which requests that the home network operator 6-H validates the subscriber, and also the IMEI. The home network operator 6-H generates and transmits (S32) the nonces to the visiting network operator 6-V, and the visiting network operator 6-V passes the nonces to the terminal device 2 (S33). The terminal 2 generates the signature based on the IMEI and nonces (as discussed at step S5 of FIG. 5) and the signature is returned to the home network operator 6-H via the visiting network operator 6-V (S34, S35). The home network operator 6-H retrieves the corresponding device certificate and validates (S36) the signature using the certificate (for example as in steps S7-S9 of FIG. 5). The home network operator 6-H informs (S37) the visiting network operator 6-V whether the IMEI has been verified. If the IMEI has been verified the visiting network operator 6-V can allow (S38) network access for the terminal device 2 to the visiting network (provided the IMSI number has also been validated by the home network operator 6-H—note that IMSI verification is not shown in FIG. 7). If the IMEI has not been verified by the home network operator 6-H, then the visiting network operator 6-V rejects (S39) access to the network.

FIGS. 5-7 show examples of a possible authentication procedure, but it will be appreciated that other procedures could also be used. For instance while FIG. 5 shows certain steps of the method being performed by certain elements such as the communication interface 24 or the processor 14, other examples could perform the same functions in different elements of the device 2. For example, FIG. 5 shows that a trusted application executing on the processor 14 controls certain parts of the authentication procedure (e.g. generating the signature at step S5), but in other examples the terminal device side of the authentication procedure could be handled entirely by the communication interface 24 and may not involve communication with the application processor 14 at all. In this case, there would be no need for a trusted application or the protected channel 30 between the communication interface 24 and application processor 14. Also, as mentioned above, the key server 10 is not essential and in other examples the certificate (or other form of verification information for checking the binding between device 2 and IMEI) could be obtained from the device 2 itself or could already be held by the network operator 6. Also, the order of the steps could be varied—e.g. while FIG. 5 shows the IMEI being transmitted at step S1, it could also be transmitted later in the process, e.g. the IMEI could be transmitted to the network operator only once the IMSI validation has already been successful.

Hence, in summary, a network access control method can be provided, comprising receiving a handset identifier of a requesting terminal device seeking access to a mobile network; retrieving verification information for verifying an identity of an authorised terminal device associated with the handset identifier; verifying, based on the verification information, whether the requesting terminal device is said authorised terminal device; and controlling access to the mobile network in dependence on whether the requesting terminal device is verified as said authorised terminal device. By verifying that the device presenting the handset identifier is actually the authorised device bound to that handset identifier (rather than merely whether the IMEI is known to relate to a stolen device), cloning of handset identifiers can be protected against, to reduce the chance that a stolen or tampered device can be successfully used by an adversary to gain access to the network.

The verification information used to verify the identity of the authorised terminal device can take various forms. In general the verification information may be any information which enables the network operator to identify whether the terminal device has some secret information embedded in the terminal device during an earlier device provisioning phase (e.g. during manufacture). For example, the verification information may comprise cryptographic identity information representing a cryptographic identity of the authorised terminal device associated with the handset identifier. For example, the cryptographic identity information may specify at least a cryptographic key and the handset identifier associated with the authorised terminal device. The cryptographic key in the verification information could be a symmetric key also held by the device itself, or a public key which corresponds to a private key held by the device for proving its identity. Hence, on authenticating the handset identifier of a device, a signature value can be received, which corresponds to a result of signing a block of information including the handset identifier using the corresponding cryptographic key of the requesting terminal device. The network operator may then decrypt the signature value using the cryptographic key specified by the cryptographic identity information, and verify whether a handset identifier extracted from the decrypted signature value matches the handset identifier specified by the cryptographic identity information, in order to control network access.

As discussed above, the block of information signed by the device may include a function of at least one freshness indicator shared with the requesting terminal device which varies between different requests for use of the mobile network. The verifying of the handset identifier may include verifying whether a value extracted from the decrypted signature value matches the function of the freshness indicator. The freshness indicator can be any request-specific value which varies from request to request. By requiring that the terminal device specifies the shared freshness indicator in the signature, this protects against replay attacks, so that an attacker cannot sniff the signature used for successful network access by a given device for one request, and then use the same signature to attempt network access itself on a later request, as the freshness indicator in the replayed signature would not match the freshness indicator expected by the network operator. In one example, the freshness indicator could be at least one nonce (single use random number) transmitted to the requesting terminal device by the network operator. The nonce could be the same nonces used for subscriber (IMSI number) validation, or could be an entirely different set of nonces. Alternatively, the freshness indicator could be some other indicator which can distinguish different requests, e.g. if the terminal device and network both have synchronized monotonic clocks, the current clock time could be used as a freshness indicator. Also, even if the clocks are not synchronised, the network operator could use the time indicated by its own clock as the freshness indicator, and transmit it to the terminal device in a similar way to the nonces described above, and verify on receipt of the signature that the decrypted value in the signature matches the time transmitted to the terminal device.

In some instances, on successful handset identifier verification, when the requesting terminal device is verified as the authorised terminal device, the handset identifier of the requesting terminal device can be associated with subscriber information corresponding to a subscriber identification number specified by the requesting terminal device. On subsequent network access, when the handset identifier of the requesting terminal device specifying a given subscriber identification number matches the handset identifier associated with the subscriber information corresponding to the given subscriber identification number, the requesting terminal device can be verified as the authorised terminal device without checking the verification information.

Hence, an alternative to using the cryptographic information as verification information for validating the handset identifier could be that the verification information comprises at least one previously verified handset identifier associated with a subscriber information number specified by the requesting terminal device. In this case, the verifying of the handset identifier comprises checking whether the handset identifier of the requesting terminal device matches one of the one or more previously verified handset identifiers associated with the subscriber information number. Hence, it is not essential to actually perform the check of the cryptographic identity of the terminal device at the time of accessing the network. For example, while inclusion of a given handset identifier in the list of previously verified handset identifier may require cryptographic identification that a terminal device specifying the subscriber information number and the given handset identifier is the authorised terminal device associated with the given handset identifier, this cryptographic identification could be performed earlier, and at the point of seeking network access the verification of the handset identifier can simply include checking whether the handset identifier has already been verified as authentic for the particular handset seeking to access the network.

In some instances, the verifying of the handset identifier may be performed in response to a request for connection to the network, for a device not yet connected to the network. While limited network communication may be required to enable exchange of the handset identifier, freshness indicator, subscriber number (e.g. IMSI number), signature etc. as part of the verification handshake protocol, the requesting terminal device may be prevented from switching to a full communication mode in which at least one communication functionality other than a limited subset of communication functionality is allowed, until the requesting terminal device has been verified as the authorised terminal device bound to the handset identifier specified. For example, the limited communication mode may be a mode in which only emergency calls and the handshaking for the handset identifier and subscriber verification is allowed, but the full communication mode may also permit other functionality such as voice calls, SMS messaging, etc.

Alternatively, the verifying of the handset identifier may be performed for a device which is already connected to the network, but is now requesting a specific communication functionality for which handset identifier verification is required. Hence, whether that specific communication functionality is permitted may depend on whether the requesting terminal device is verified to be the authorised terminal device associated with the handset identifier. Examples of specific communication functionality which could be permitted only on condition that handset identifier verification is successful can include the ability to send or receive text messages, make a mobile call, use data services, etc. By performing the handset identifier verification in response to a request for specific communication functionality, rather than generally on connection to the network, this can support usage models where some functionality is permitted even on unauthorised devices but other functionality is prevented. For example, unauthorised devices may still be allowed to receive incoming voice calls, but may require the handset identifier to be validated by the network before being permitted to make outgoing calls.

In the above examples, when the handset identifier validation fails, the network access is blocked. This blocking could be permanent or could be temporary (for a limited time period). Also, failed IMEI validation attempts could be logged in an audit trail which can be maintained, e.g. for allowing the police or other authorities to track data on use of stolen or tampered devices.

As is clear from FIGS. 5-7 above, the method for controlling the network access by verifying the handset identifier could be performed either by a network operator device for controlling access to the particular mobile network to which the requesting terminal device is seeking access (e.g. in the case of usage within the subscriber's home network), or by a first network operator device for controlling access to a first mobile network, in response to a request from a second network operator device for controlling access to a second mobile network to which the requesting terminal device is seeking access (e.g. where the first network operator device corresponds to the subscriber's home network and the second network operator device corresponds to the visiting network).

In a corresponding way, a terminal device may have storage circuitry to store a handset identifier identifying the terminal device and a cryptographic key for proving an identity of the terminal device, processing circuitry to generate signature information by signing a block of information including the handset identifier using the cryptographic key; and communication circuitry to communicate on a mobile network, wherein during a network connection process for negotiating access to the mobile network with a network control device, the communication circuitry is configured to communicate the signature information to the network control device. Hence, the device can authenticate itself to the network and prove that the handset identifier it provided is actually associated with that particular device.

Note that the signature information provided to the network by the terminal device could be a hash of the handset identifier alone, or could be information obtained by signing a block of information including the handset identifier and at least one other piece of information, such as at least one freshness indicator transmitted from the network to the terminal device.

The terminal device may have a hardware architecture providing a protected communication channel for protecting at least the cryptographic key between the storage circuitry, the processing circuitry and the communication circuitry. This protects against hardware attacks on the key within the terminal device itself. Optionally the protected communication channel could also be used to protect the handset identifier as well as the cryptographic key, although this is not essential as even if the handset identifier is leaked, a terminal device not having the same cryptographic key would not be able to authenticate itself as the proper authorised device associated with the handset identifier.

In some examples, the handset identifier may comprise an International Mobile Equipment Identity (IMEI) number. For example, in the 3GPP communication standards, the IMEI is used as the identifier of the particular mobile handset. However, in other standards another identifier could also be used as the handset identifier.

While examples discussed above discuss a case where a SIM card 28 is used to store the IMSI and IMEI numbers, other embodiments could provide a "virtual SIM card" where the functionality of the SIM card for identifying the device to the network can be incorporated within the terminal device itself, rather than needing a separate hardware card. For example, a trusted application within the secure world 30 could implement the functionality of the SIM card. Therefore, providing a hardware SIM card 28 is not essential.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A terminal device comprising:
storage circuitry to store a handset identifier identifying the terminal device and a cryptographic key for proving an identity of the terminal device;
processing circuitry to generate signature information by signing a block of information including the handset identifier using the cryptographic key; and
communication circuitry to communicate on a mobile network, wherein during a network connection process for negotiating access to the mobile network with a network control device, the communication circuitry is configured to communicate the signature information to the network control device, wherein
the signature information comprises information for verifying a binding between the handset identifier and the terminal device, and
during the network connection process for negotiating access to the mobile network with the network control device, the communication circuitry is configured to receive an indication from the network control device whether the terminal device is allowed to switch from a limited communication mode, in which a limited subset of network communication functionality including emergency calls only and handshaking for the handset identifier based on retrieval of the verification information is allowed, to a full communication mode in which communication functionality other than said limited subset is allowed, in dependence on whether the binding between the handset identifier and the terminal device allows the network control device to verify the terminal device as an authorized terminal device.

2. The terminal device according to claim 1, wherein said block of information comprises a function of at least one freshness indicator shared between the network control device and the terminal device which varies between different requests for use of the mobile network.

3. The terminal device according to claim 2, wherein said at least one freshness indicator comprises at least one nonce received at the terminal device.

4. The terminal device according to claim 1, wherein the device has a hardware architecture providing a protected communication channel for protecting at least the cryptographic key between the storage circuitry, the processing circuitry and the communication circuitry.

5. The terminal device according to claim 1, wherein the handset identifier comprises an International Mobile Equipment Identity (IMEI) number.

6. The terminal device according to claim 1, wherein the network control device is a network operator device.

7. A method for a terminal device seeking access to a mobile network, the method comprising:
retrieving a handset identifier identifying the terminal device and a cryptographic key for proving an identity of the terminal device from storage circuitry of the terminal device;

generating signature information by signing a block of information including the handset identifier using the cryptographic key; and during a network connection process for negotiating access to the mobile network with a network control device, communicating the signature information to the network control device, wherein the signature information comprises information for verifying a binding between the handset identifier and the terminal device, and during the network connection process for negotiating access to the mobile network with the network control device, an indication from the network control device is received whether the terminal device is allowed to switch from a limited communication mode, in which a limited subset of network communication functionality including emergency calls only and handshaking for the handset identifier based on retrieval of the verification information is allowed, to a full communication mode in which communication functionality other than said limited subset is allowed, in dependence on whether the binding between the handset identifier and the terminal device allows the network control device to verify the terminal device as an authorized terminal device.

8. The method according to claim 7, wherein said block of information comprises a function of at least one freshness indicator shared between the network control device and the terminal device which varies between different requests for use of the mobile network.

9. The method according to claim 8, wherein said at least one freshness indicator comprises at least one nonce received at the terminal device.

10. The method according to claim 7, wherein the handset identifier comprises an International Mobile Equipment Identity (IMEI) number.

11. The method according to claim 7, wherein the network control device is a network operator device.

12. A non-transitory, computer-readable storage medium storing a computer program for controlling a data processing apparatus to perform the method of claim 7.

\* \* \* \* \*